United States Patent
Prakash et al.

(10) Patent No.: US 10,316,872 B2
(45) Date of Patent: Jun. 11, 2019

(54) TWO-DIMENSIONAL MAGNETIC TRAP ARRAYS FOR DROPLET CONTROL

(71) Applicant: The Board of Trustees of the Leland Stanford Junior University, Palo Alto, CA (US)

(72) Inventors: Manu Prakash, San Francisco, CA (US); Georgios Katsikis, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 9 days.

(21) Appl. No.: 14/426,544

(22) PCT Filed: Aug. 27, 2013

(86) PCT No.: PCT/US2013/056821
§ 371 (c)(1),
(2) Date: Mar. 6, 2015

(87) PCT Pub. No.: WO2014/035979
PCT Pub. Date: Mar. 6, 2014

(65) Prior Publication Data
US 2015/0267726 A1 Sep. 24, 2015

Related U.S. Application Data

(60) Provisional application No. 61/693,346, filed on Aug. 27, 2012.

(51) Int. Cl.
*F15D 1/00* (2006.01)
*B01J 19/08* (2006.01)
*B01L 3/00* (2006.01)

(52) U.S. Cl.
CPC .......... *F15D 1/0075* (2013.01); *B01J 19/087* (2013.01); *B01L 3/502792* (2013.01);
(Continued)

(58) Field of Classification Search
USPC ............ 422/186, 186.01, 502–504; 324/204, 324/205, 214; 204/554, 557; 436/526,
(Continued)

(56) References Cited

U.S. PATENT DOCUMENTS 7,682,837 B2 3/2010 Jain et al.
7,815,871 B2 10/2010 Pamula et al.
(Continued)

FOREIGN PATENT DOCUMENTS

EP 2685273 A1 * 1/2014 ......... G01R 33/1269

*Primary Examiner* — Dean Kwak
(74) *Attorney, Agent, or Firm* — Lumen Patent Firm (57) ABSTRACT

A magnetic trap droplet controller is provided that includes a solid substrate, a controller operated by an appropriately programmed computer, a two-dimensional distribution of magnetized domains disposed on a surface of the solid substrate, a fluid chamber disposed above the two-dimensional distribution of magnetized domains, and an active magnet, where the active magnet is disposed to provide a dynamic magnetic field in-plane with the solid substrate, where the dynamic magnetic field controls north and south poles of the two-dimensional distribution of magnetized domains according to the controller, where a fluid under test that is disposed in a carrier fluid that is disposed in the fluid chamber propagates according to the controlled north and south poles of the two-dimensional distribution of the magnetized domains.

17 Claims, 10 Drawing Sheets

(52) U.S. Cl.
CPC ............... *B01L 2200/0668* (2013.01); *B01L 2300/0816* (2013.01); *B01L 2400/043* (2013.01); *F15D 1/00* (2013.01); *Y10T 137/206* (2015.04)

(58) Field of Classification Search
USPC .......................................... 436/63, 149, 806
See application file for complete search history.

(56) References Cited

U.S. PATENT DOCUMENTS

| | | | |
|---|---|---|---|
| 8,591,830 B2 | 11/2013 | Sudarsan et al. | |
| 2002/0106314 A1* | 8/2002 | Pelrine ................. | B01J 19/0046 422/186 |
| 2012/0122731 A1* | 5/2012 | Soh ................... | B01L 3/502761 506/12 |
| 2012/0164680 A1* | 6/2012 | McNaughton ......... | C12M 41/36 435/32 |

* cited by examiner

TWO-DIMENSIONAL MAGNETIC TRAP ARRAYS FOR DROPLET CONTROL

CROSS-REFERENCE TO RELATED APPLICATIONS

This application is a 371 of PCT Patent Application PCT/US2013/056821 filed Aug. 27, 2013, which claims the benefit of U.S. Application 61/693,346 filed Aug. 27, 2012.

FIELD OF THE INVENTION

The current invention relates to microfluidics. More particularly, the invention relates to propagating microfluids according to a two-dimensional distribution of magnetized domains.

BACKGROUND OF THE INVENTION

Droplet based microfluidics is a rapidly growing interdisciplinary field of research with numerous applications ranging from fast analytical systems or synthesis of advanced materials to protein crystallization and biological assays for living cells. What is needed is a device and method for the precise and reliable control of multiple droplet volumes simultaneously with a control mechanism of minimal complexity.

SUMMARY OF THE INVENTION

To address the needs in the art, a magnetic trap droplet controller is provided that includes a solid substrate, a controller operated by an appropriately programmed computer, a two-dimensional distribution of magnetized domains disposed on the surface of the solid substrate, a fluid chamber disposed above the two-dimensional distribution of magnetized domains, and an active magnet., where the active magnet is disposed to provide a dynamic magnetic field in-plane with the solid substrate, where the dynamic magnetic field controls north and south poles of the two-dimensional distribution of magnetized domains according to the controller, where a fluid under test that is disposed in a carrier fluid that is disposed in the fluid chamber propagates according to the controlled north and south poles of the two-dimensional distribution of the magnetized domains.

According to one aspect of the invention, the surface of the solid substrate includes a flat surface or a non-flat surface. In one aspect, the flat surface includes an epoxy-based negative photoresist or silica.

In a further aspect of the invention, the two-dimensional distribution of magnetized domains includes a distribution of magnetic material having a shape that includes T-shape, I-shape, linear-shape, serpentine-shape, undulating width-shape, stepped-shape, zig-zag-shape, chevron-shape, or an arbitrary-shape.

According to another aspect of the invention, the fluid chamber includes a volume disposed between two hydrophobic layers. In one aspect, the hydrophobic layers can be Teflon, PDMS, fluorosilanes, silicon-based spray-on coating, or superhydrophobic materials. In another aspect, the fluid chamber includes a carrier fluid, where the carrier fluid can be magnetic fluid, non-magnetic fluid, water, silicon oil or fluoroinert oil.

In yet another aspect of the invention, the fluid chamber includes a fluid under test, where the fluid under test can be water-based ferrofluid, oil-based ferrofluid, fluid with magnetic beads, magnetic nanoparticles dispensed in a fluid, and fluid with magnetic surfactant on the surface. According to one aspect, the fluid under test includes droplets with volumes in a range from 1 nl to 100 µl.

In a further aspect of the invention, the solid substrate can be a material that includes silica, $SiO_2$, silicon wafer, plastic, metal or a non-magnetic solid surface.

According to another aspect of the invention, the magnetized domain includes permalloy bars, or soft magnetic material.

In another aspect of the invention, the dynamic magnetic field can be a rotating magnetic field, a varying magnitude magnetic field, an x-direction oscillating magnetic field, a y-direction oscillating magnetic field, an ON-OFF magnetic field, clocked magnetic field, or a periodically varying magnetic field profile.

According to another aspect of the invention, the fluid chamber includes a fluid under test and a carrier fluid, where i) the carrier fluid is non-ferric and the fluid under test is ferric, or ii) the carrier fluid ferric and the fluid under test is non-ferric, or iii) the carrier fluid non-ferric and the fluid under test is a multi-phase emulsion of ferric fluid outside and non-ferric fluid inside or ferric fluid inside and non-ferric fluid outside.

In another aspect of the invention, the fluid chamber includes fluid guides, where the fluid guides can include walls, channels, grooves, indentations, protrusions, and channels, where the fluid guides are disposed to provide hydrodynamic resistant inside said fluid chamber.

In a further aspect of the invention, the fluid chamber includes a fluid input port and a fluid output port, where i) the fluid under test, ii) the carrier fluid, or iii) the fluid under test and the carrier fluid are input through the input port and output through the output port.

In yet another aspect of the invention, the two-dimensional distribution of magnetized domains are disposed i) to collide a droplet of the fluid under test with another droplet of the fluid under test or ii) to merge two droplets of the fluid under test, or iii) break a droplet of the fluid under test into at least two smaller droplets of said fluid under test iv) to dispense known amount of the fluid under test v) to dilute the fluid under test vi) to concentrate the fluid under test vii) to start chemical reactions in the fluid under test viii) to stop a chemical reaction of the fluid under test.

According to one aspect of the invention, the active magnet includes a first magnetic coil pair having induction along an x-z plane of the magnetic trap droplet controller, a second magnetic coil pair having induction along an along a y-z plane of the magnetic trap droplet controller and a magnet having a magnetic field along the x-y plane of the magnetic trap.

In a further aspect of the invention, the active magnet is disposed external to the solid substrate or the active magnet is embedded on the solid substrate.

In another aspect, the invention further includes a microcoil or current wire disposed above the fluid chamber and disposed to apply an external magnetic field external to the droplet controller.

BRIEF DESCRIPTION OF THE DRAWINGS

FIG. 6a-6h show various arrangements of magnetic domain architectures, according to different embodiments of the invention.

FIG. 7a-7e show drawings of droplet manipulation circuits, according to different embodiments of the invention.

DETAILED DESCRIPTION

The current invention provides a novel propagation mechanism for droplet microfluidics, and offers unique advantages in terms of clocked, tunable and selective transport of targeted species in the micro and sub-micro scale. Applications of the invention range widely from control of biological materials (biomolecules, single cells, chemical libraries) to active fluidic displays.

Figure 8:
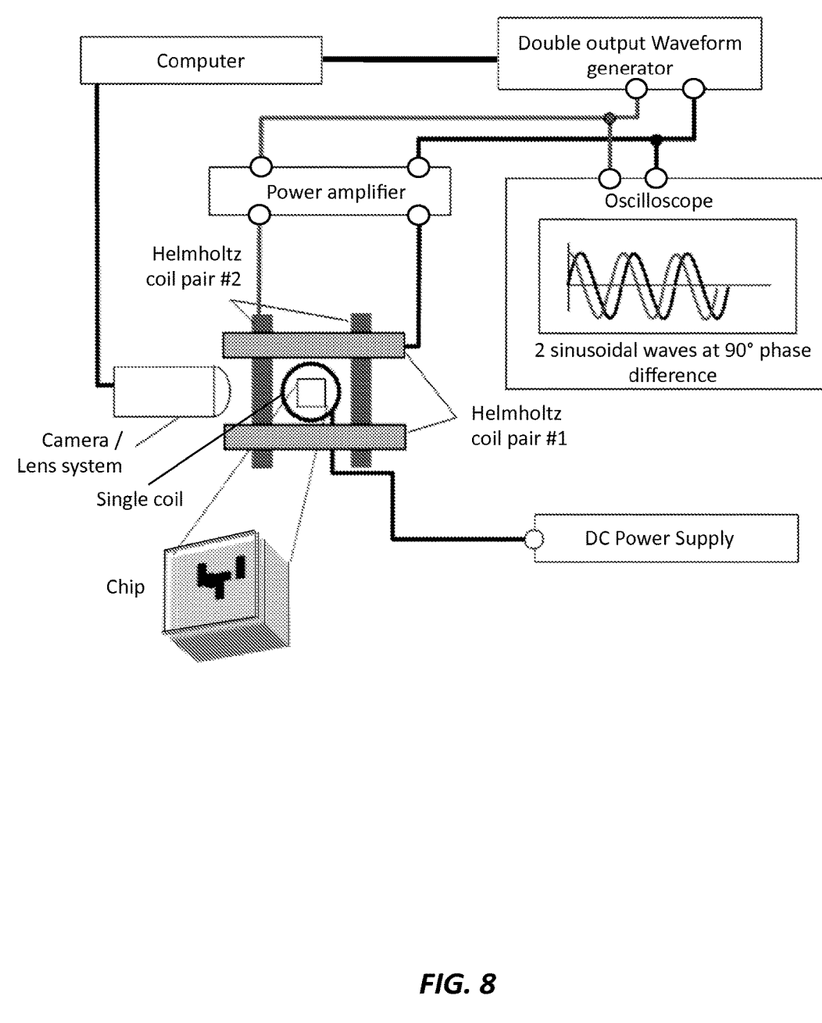
FIG. 8 shows a schematic of an experimental test apparatus, according to one embodiment of the invention.
Figure 9:
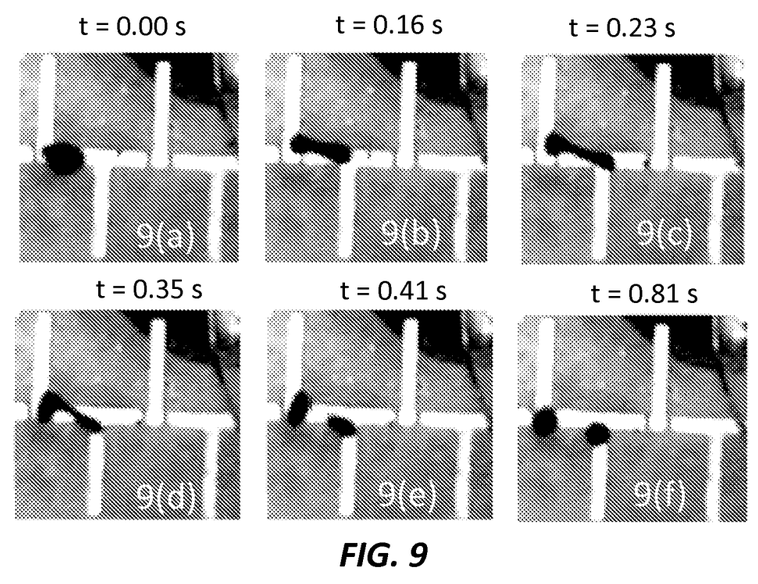
FIGS. 9a-9f show the break-up of a water-based ferrofluid droplet of 1 µL under the influence of a 264 Gauss bias field, according to one embodiment of the invention.
Figure 10:
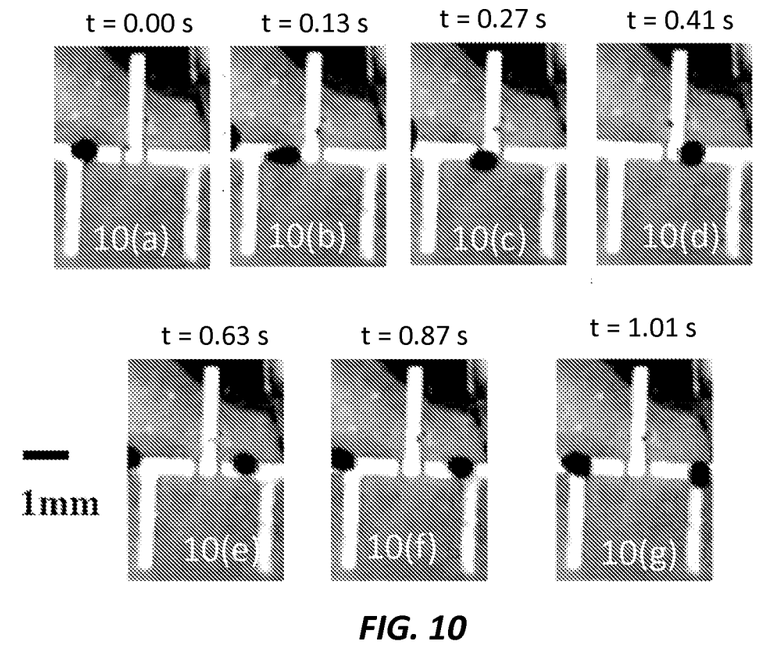
FIGS. 10a-10g show a ferrofluid droplet propagating and completing a full period, at a 280 Gauss bias field and a 1 Hz 20 Gauss rotating field, according to one embodiment of the invention.

FIGS. 1a-1e show cross section views of magnetic trap droplet controllers 100, according to different embodiments, describing the layers of materials for the device, where it is understood throughout that the term fluid chip refers to magnetic trap droplet controller, and an appropriately programmed computer can include a microcontroller, a periodic waveform (clock signal) generator, or any switched signal generator (see FIG. 8). The active magnets needed to provide the magnetic fields for the operation of the controller are not included in this figure for clarity. The four embodiments of FIGS. 1a-1e all include a solid substrate, a two-dimensional distribution of magnetized domains disposed on a surface of the solid substrate and a fluid chamber disposed above the two-dimensional distribution of magnetized domains, where the fluid chamber is disposed to contain the fluid under test and the carrier fluid. The solid substrate can be a material that includes silica, $SiO_2$, silcon wafer, plastic, metal or a non-magnetic solid surface. The magnetized domains can be permalloy bars, or soft magnetic material. The flow chamber has hydrophobic layer on both its sides where the hydrophobic layer can be Teflon, PDMS, fluorosilanes, silicon based spray on coating or superhydrophobic materials. The invention further includes a top cover which is shown to be made of glass but could also be PDMS.

In a further aspect of the invention, the fluid chamber includes a fluid input port and a fluid output port for inputting and outputting the fluid under test and/or the carrier fluid. The embodiment of the invention, in FIG. 1a, has a non-flat surface of the solid substrate while the embodiment in FIG. 1b has a flat surface of the substrate that can further include an epoxy-based negative photoresist, such as Su-8 photoresist or silica.

Figure 1:
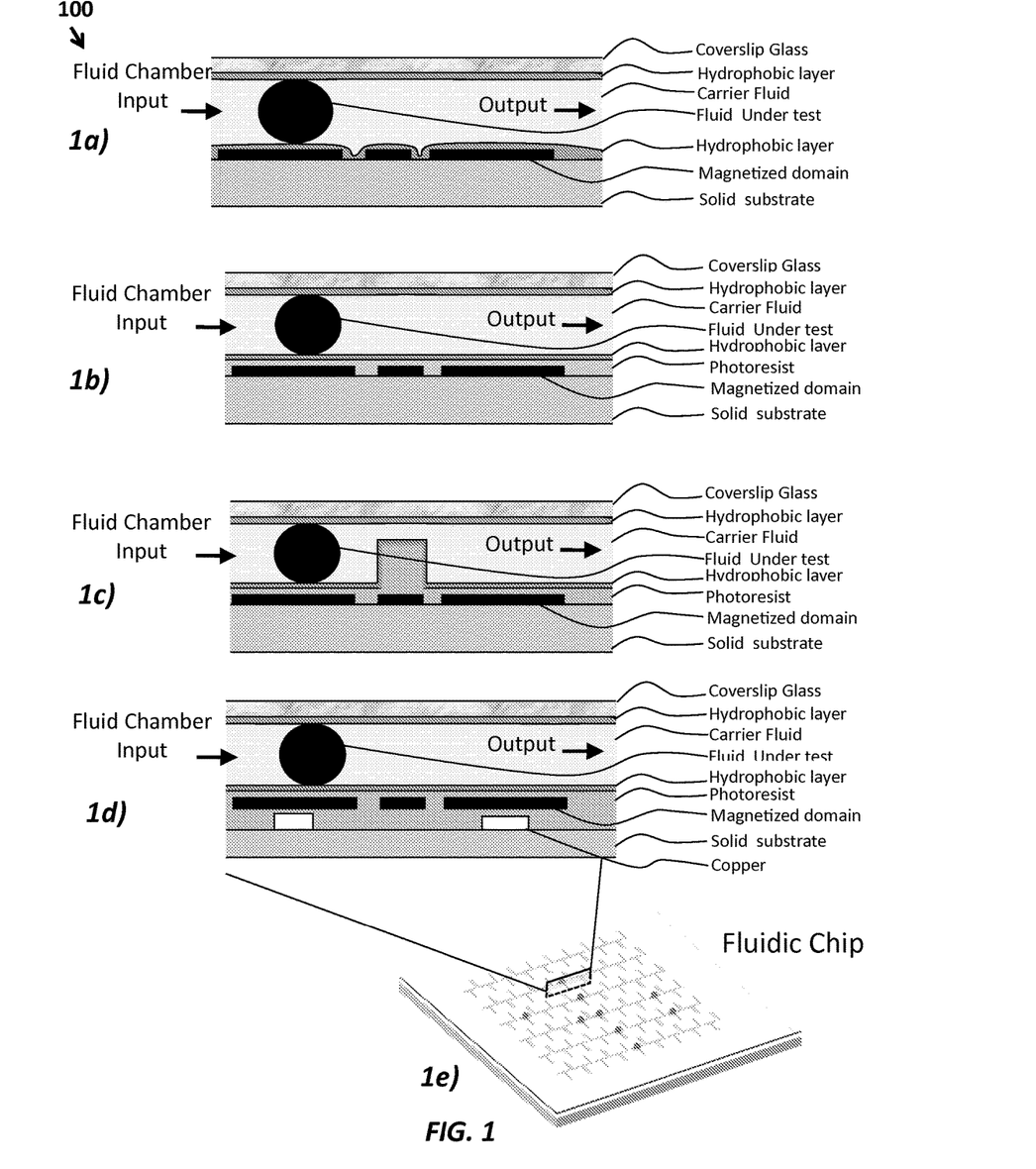
FIGS. 1a-1e show cross section schematic drawings of the fluidic chip of the magnetic trap droplet controller, according embodiments of the invention.

According to the embodiment in FIG. 1c, the fluid chamber includes fluid guides. FIG. 1c shows an indentation fluid guide providing hydrodynamic resistance or geometric restriction, where it is understood that other fluid guide features can be implemented to the fluid chamber to provide hydrodynamic resistance such as walls, channels, grooves, protrusions, and channels, where the fluid guides are disposed to provide hydrodynamic resistance inside said fluid chamber.

As shown in FIG. 1d, another embodiment of the invention may further include layers of electric conductive material like copper, graphite below the magnetized domains, which can generate local magnetic field. It is also understood micro-coils can also be included in the below the magnetized domains or on top of the top cover.

Figure 2:
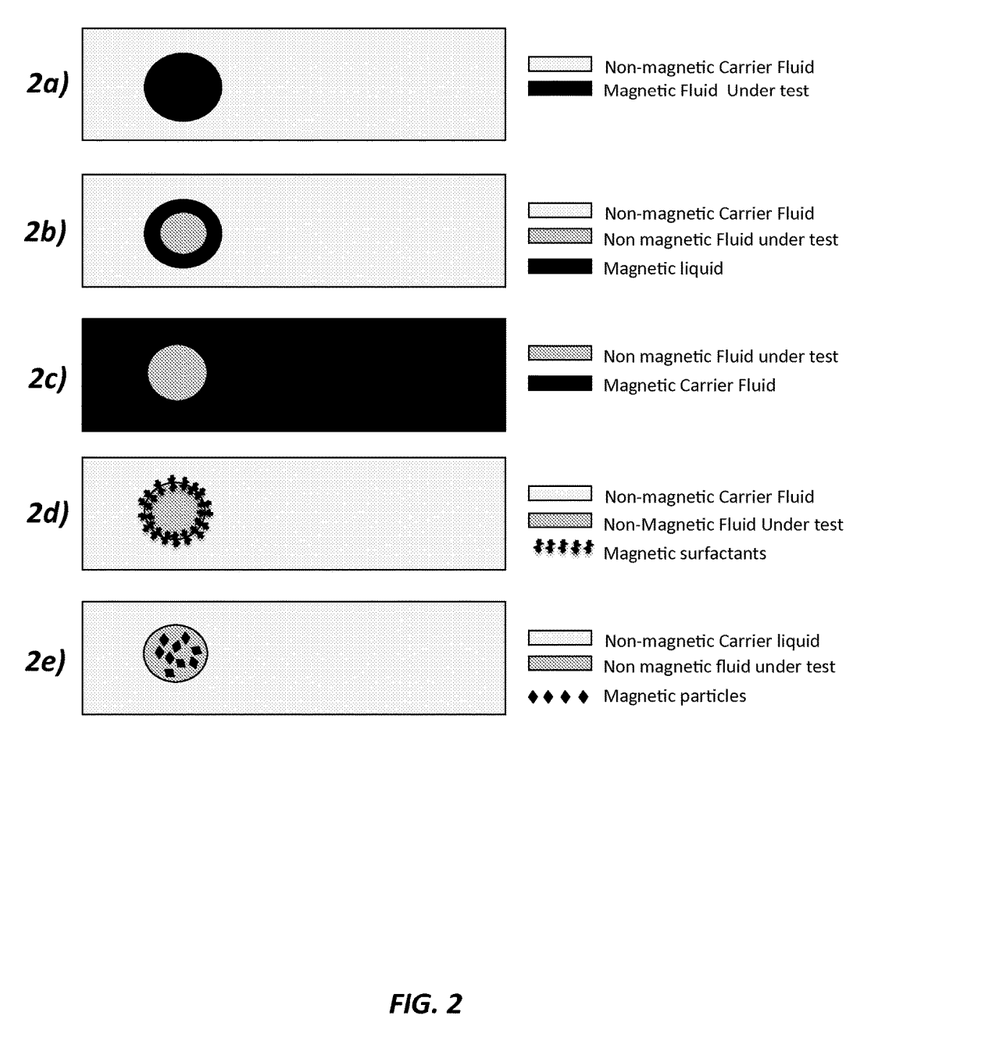
FIGS. 2a-2e show schematic drawings of combinations of fluid under test and carrier Fluid, according to five different embodiments of the invention.
Figure 3:
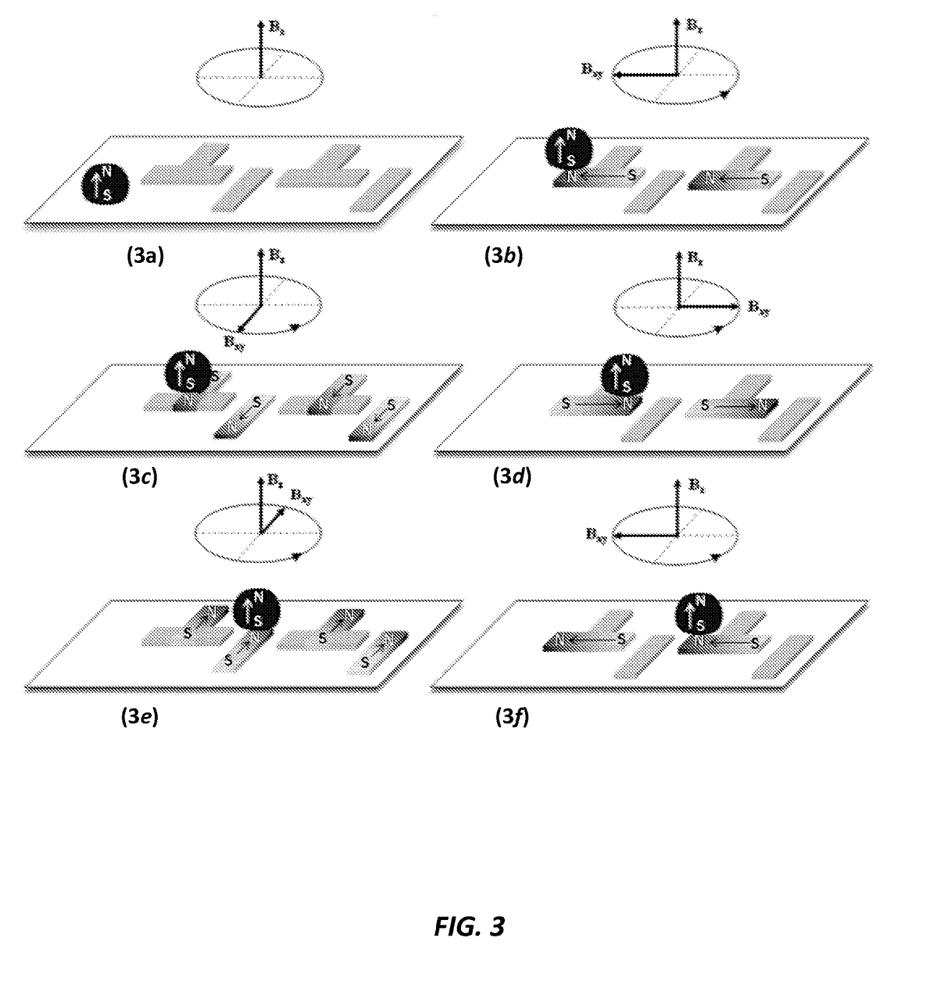
FIGS. 3a-3f show a schematic drawing of the principle of operation where a ferrofluid drop is propagating across a two-dimensional distribution of magnetized domains disposed on a surface according to the controlled north and south poles, according to one embodiment of the invention.

In FIGS. 2a-2e different embodiments of the fluid under test and carrier fluid are shown. In FIG. 2a the fluid under test is a magnetic liquid in the form of a droplet while the carrier fluid is a non-magnetic liquid forming an immiscible solution. In FIG. 2b a stable emulsion of the a non-magnetic fluid under test inside a magnetic fluid is combined with a non-magnetic carrier fluid forming an immiscible solution. In FIG. 2c the fluid under test is a non-magnetic liquid while the carrier fluid is a liquid forming an immiscible solution. In FIG. 2d the fluid under test is a non-magnetic liquid in the form of a droplet with attached magnetic surfactant while the carrier fluid is a non-magnetic liquid forming an immiscible solution. In FIG. 2e the fluid under test is a non-magnetic liquid containing magnetic particles while the carrier fluid is a non-magnetic liquid forming an immiscible solution between the two. It is understood that the fluid under test can be the desired material to be manipulated or can contain the desired material to be manipulated in liquid or solid form. Any magnetic liquid in those embodiments can be water-based ferrofluid, oil-based ferrofluid or any other type of ferrofluid.

According to one embodiment of the invention, to manipulate the domain, rotating magnetic fields are applied in the same plane as the substrate. Soft magnet arrays are deposited to the surface of the substrate and are influenced by the rotating magnetic fields forming periodically alternating north and south poles that attract and repel the droplets, causing them to move along a trajectory, where in one embodiment the active magnet provides a field in a direction normal to the solid substrate to magnetize the fluids. As shown in FIGS. 3a-3f, a schematic drawing is provided of a ferrofluid propagating across a two-dimensional distribution of magnetized domains disposed on a surface according to the controlled north and south poles, as in one embodiment of the invention.

Figure 4:
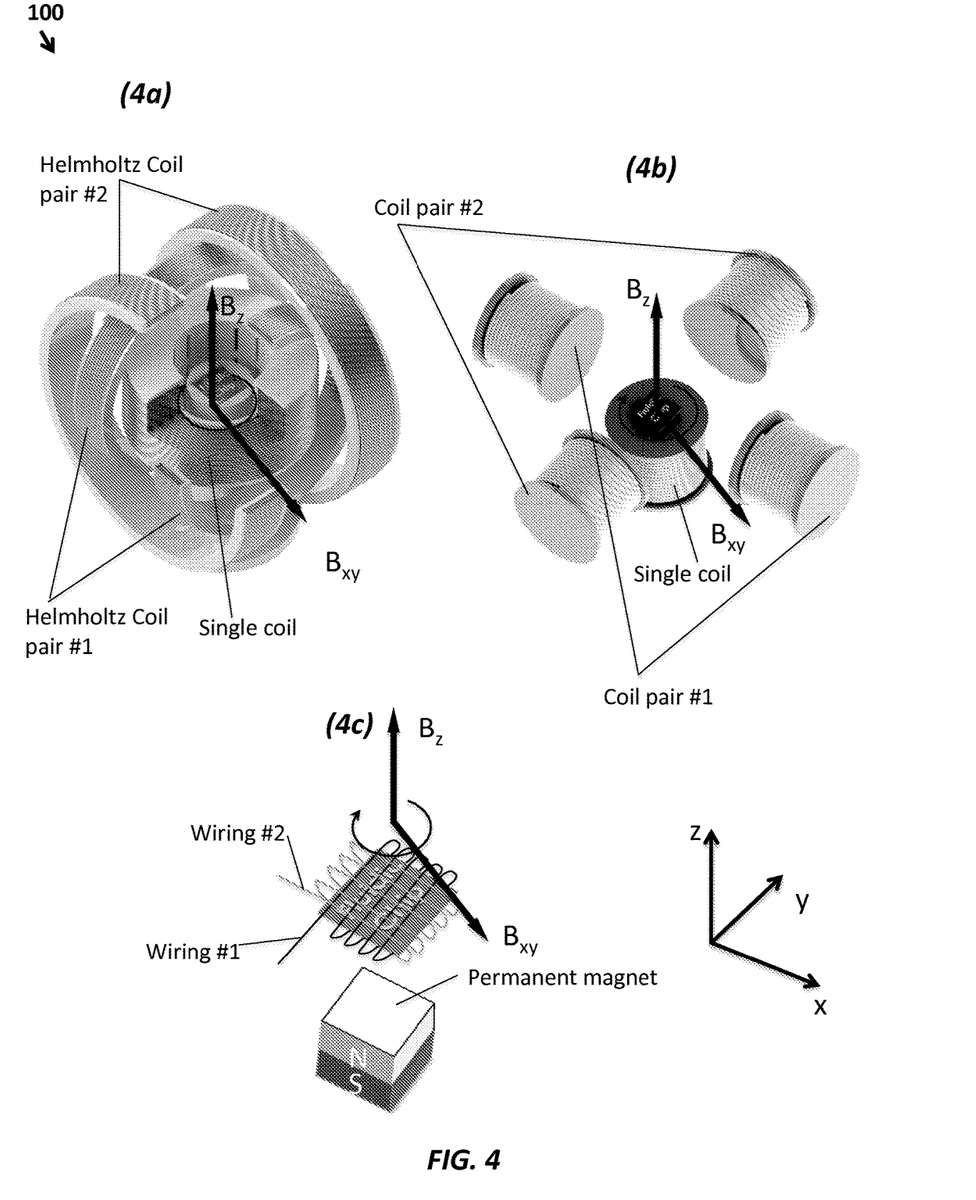
FIGS. 4a-4c show three dimensional drawings of coil arrangements to provide the magnetic fields for the operation of the fluidic chip of the droplet controller, according to three different embodiments of the invention.

FIGS. 4a-4c show different embodiments of the active magnets used in the invention. The embodiment in FIG. 4a includes two orthogonal Helmholtz coil pair for the generation of the dynamic field where the dynamic field controls north and south poles on the two dimensional distribution of magnetized domain. The dynamic magnetic field can be a rotating magnetic field (magnetic field $B_{xy}$ which lies on the xy plane), however it is understood that the dynamic magnetic field can include a varying magnitude magnetic field, an x-direction oscillating magnetic field, a y-direction oscillating magnetic field in any direction across the plane of the solid substrate, an ON-OFF magnetic field, clocked magnetic field, or a periodically varying magnetic field profile, according to different embodiments of the invention. The embodiment in FIG. 4a also includes a single coil which houses the fluidic chip controller inside and generates the magnetic field that magnetizes the magnetic liquids in the system (magnetic field $B_z$ in the z direction), either the fluid under test, or carrier liquid, magnetic surfacants or particles or in general magnetic liquids according to the embodiments in FIGS. 2a-2e. The embodiment in FIG. 4b includes coils similar to the embodiment in FIG. 4a that can be any type of coils acting as the active magnets of the system. The embodiment in FIG. 4c includes wires wound around the fluidic chip containing the droplet controller that provide the dynamic field with the same characteristics like the ones described for FIG. 4a (magnetic field $B_{xy}$ which lies on the xy plane). It is also understood that microcoils can also be embedded on the fluidic chip, similar to the embodiment shown in FIG. 1d. A permanent magnet in FIG. 4c provides the magnetic field that magnetizes the magnetic liquids in the system (magnetic field $B_z$ in the z direction).

Figure 5:
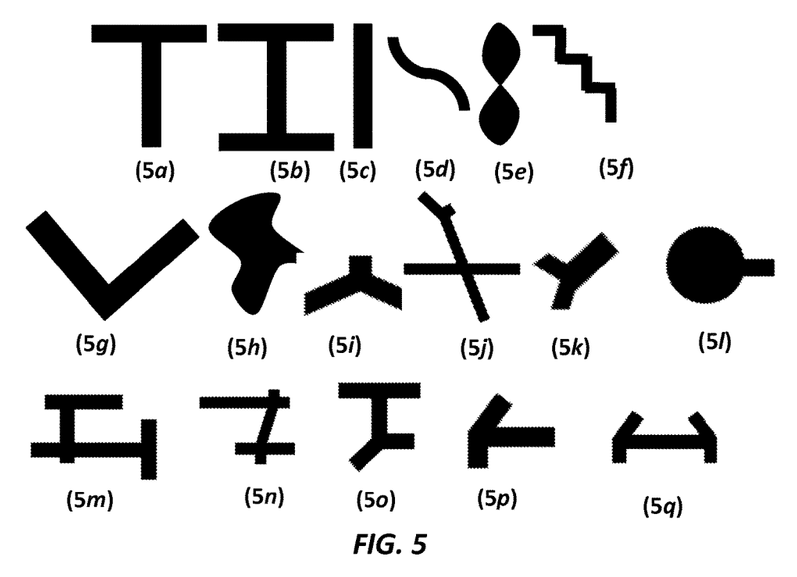
FIGS. 5a-5q show different magnetic domain architectures
Figure 6:
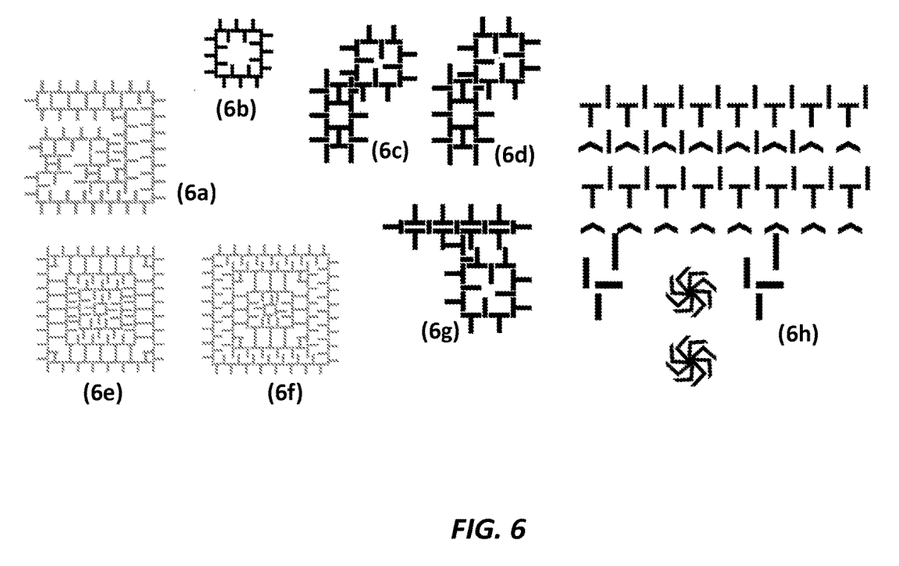
Figure 7:
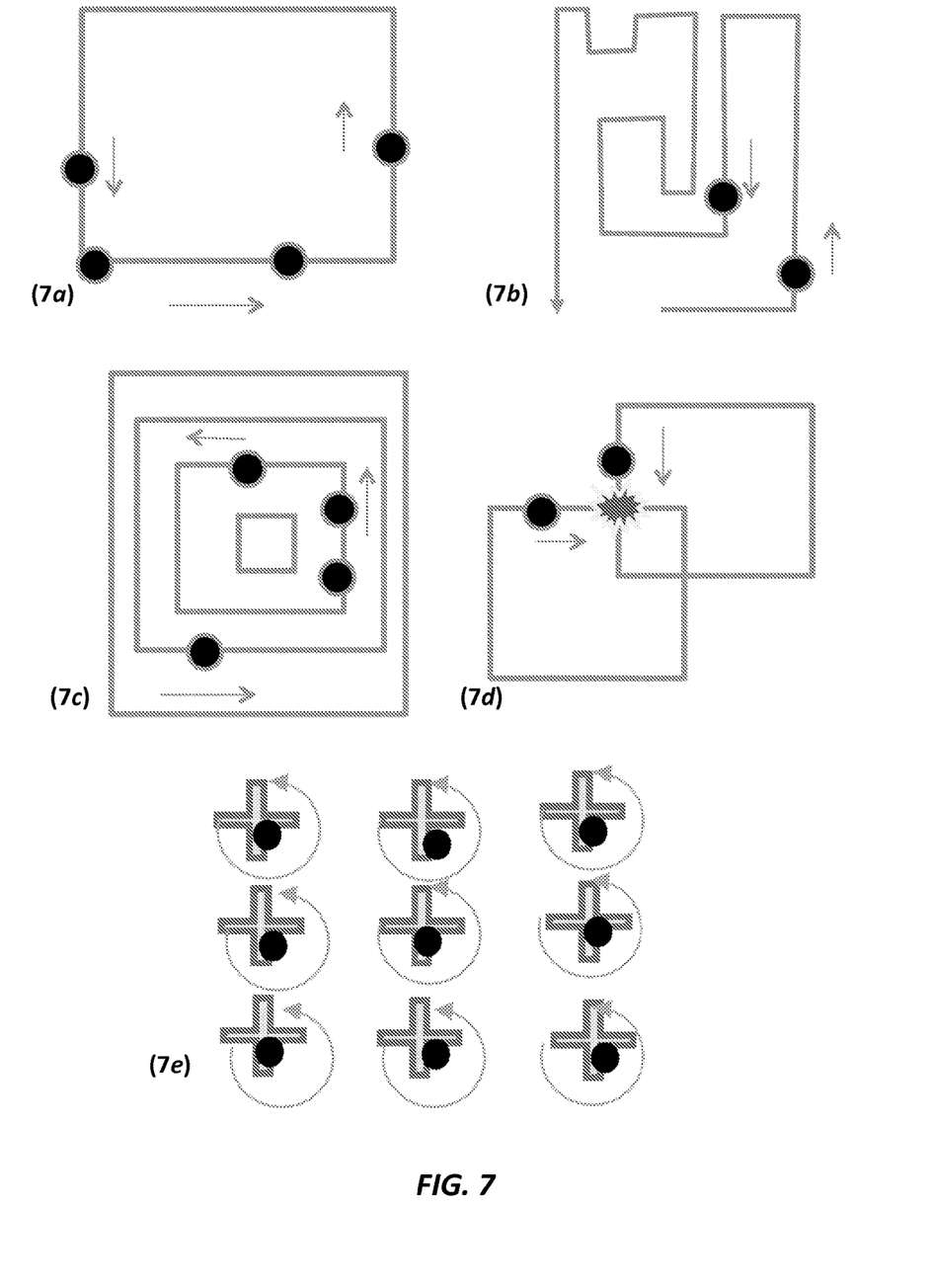

FIGS. 5a-5q show the two-dimensional distribution of magnetized domains can include a magnetic material having a shape that includes T-shape, I-shape, linear-shape, serpentine-shape, undulating width-shape, stepped-shape, zig-zag-shape, chevron-shape, or an arbitrary-shape or any possible linear, rectangular, circular arrangement, circuit pattern, or combinations of shapes for dedicated purpose.

FIGS. 6a-6h show various combinations of different shapes of the magnetized domains shown in FIGS. 5a-5q.

In a further embodiment, the invention provides large-scale, generic control schemes for transporting materials and performing logical operation with droplets in the microscale using patterned soft-magnetic structures. Exemplary architectures for droplet control are provided in FIGS. 7a-7e that include a (7a) circular loop, (7b) synchronized droplets traveling in a spiral path, (c) synchronized droplets traveling on counter-rotating loops, (7d) droplet collisions to create logic gates, and (7e) traps on a grid. Since matter can be trapped inside each of the volumes, the invention further serves as a chemical memory of species with the ability to control their position, insert or extract them in and out of the device, according to one embodiment. In yet another aspect of the invention, the two-dimensional distribution of magnetized domains can be disposed to operate in the fluid chamber contents that include: collide a droplet of the fluid under test with another droplet of the fluid under test, merge two droplets of the fluid under test, break a droplet of the fluid under test into at least two smaller droplets of the fluid under test, dispense known amount of the fluid under test, dilute the fluid under test, concentrate the fluid under test, start chemical reactions in the fluid under test, and/or stop a chemical reaction of the fluid under test.

FIG. 8 shows one embodiment of the active magnet that includes a first magnetic coil pair having induction along an x-z plane of the magnetic trap droplet controller, a second magnetic coil pair having induction along an along a y-z plane of the magnetic trap droplet controller and a magnet having a magnetic field along the x-y plane of the magnetic trap. In a further aspect of the invention, the active magnet is disposed external to the solid substrate or the active magnet is embedded on the solid substrate.

The current invention offers unique advantages for droplet microfluidics. In one embodiment, for a given track geometry, the propagation speed of the droplets is tuned by changing the magnitude of magnetic fields using electronics equipment. Additionally, since the magnetic arrays act as magnetic traps the position of the droplets are precisely controlled and also clocked by programming a variation in the magnetic field amplitudes. Furthermore, the state of the system is dependent on the track geometry and the occupancy of fluid droplet as well, since the droplets can interact. Therefore, through repulsion forces, adjacent droplets can be ejected to different tracks, altering their trajectories according to controller instructions. This manipulation can be done in parallel for multiple droplets using a minimal number of tunable parameters such as magnetic fields that can be controlled electronically.

Exemplary experiments are provided using and "T" and "I" track geometry. FIG. 8 shows a schematic of an experimental test apparatus, according to one embodiment of the invention. In FIGS. 9a-9f, the break-up of a water-based ferrofluid droplet of 1 μL is shown under the influence of a 264 Gauss bias field. In FIGS. 10a-10g, a ferrofluid droplet is propagating and completes a full period, at a 280 Gauss bias field and a 1 Hz 20 Gauss rotating field. A second droplet is propagating in sync with the first one. However, when the distance between the two droplets is small enough, there are repulsive forces between the two, which enables one of them to move forward.

Figure 11:
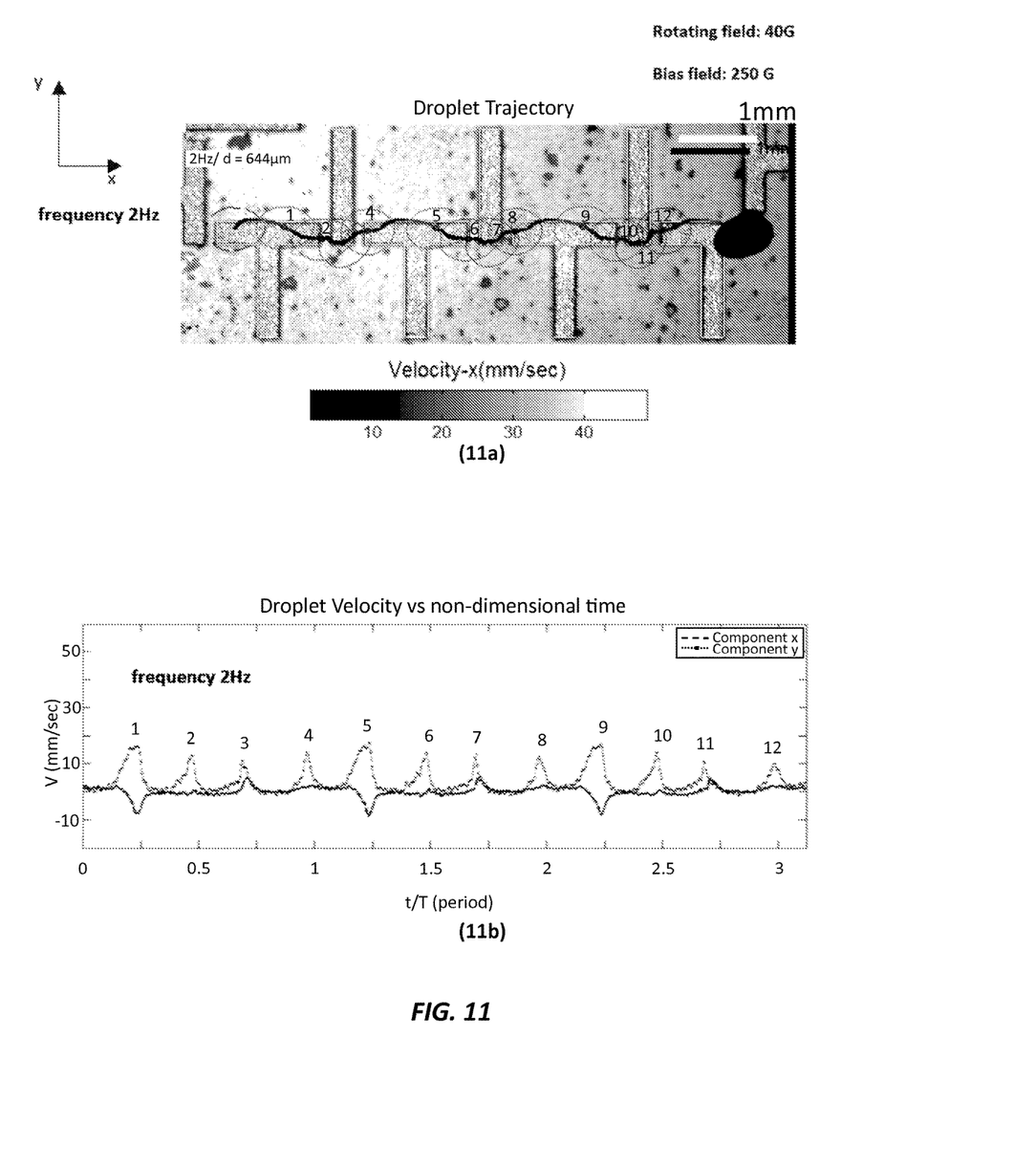
FIGS. 11a-11b show graphs of the trajectory of a propagating droplet and the plot of its velocity as a function of time for frequency of 2 Hz, according to one embodiment of the invention.
Figure 12:
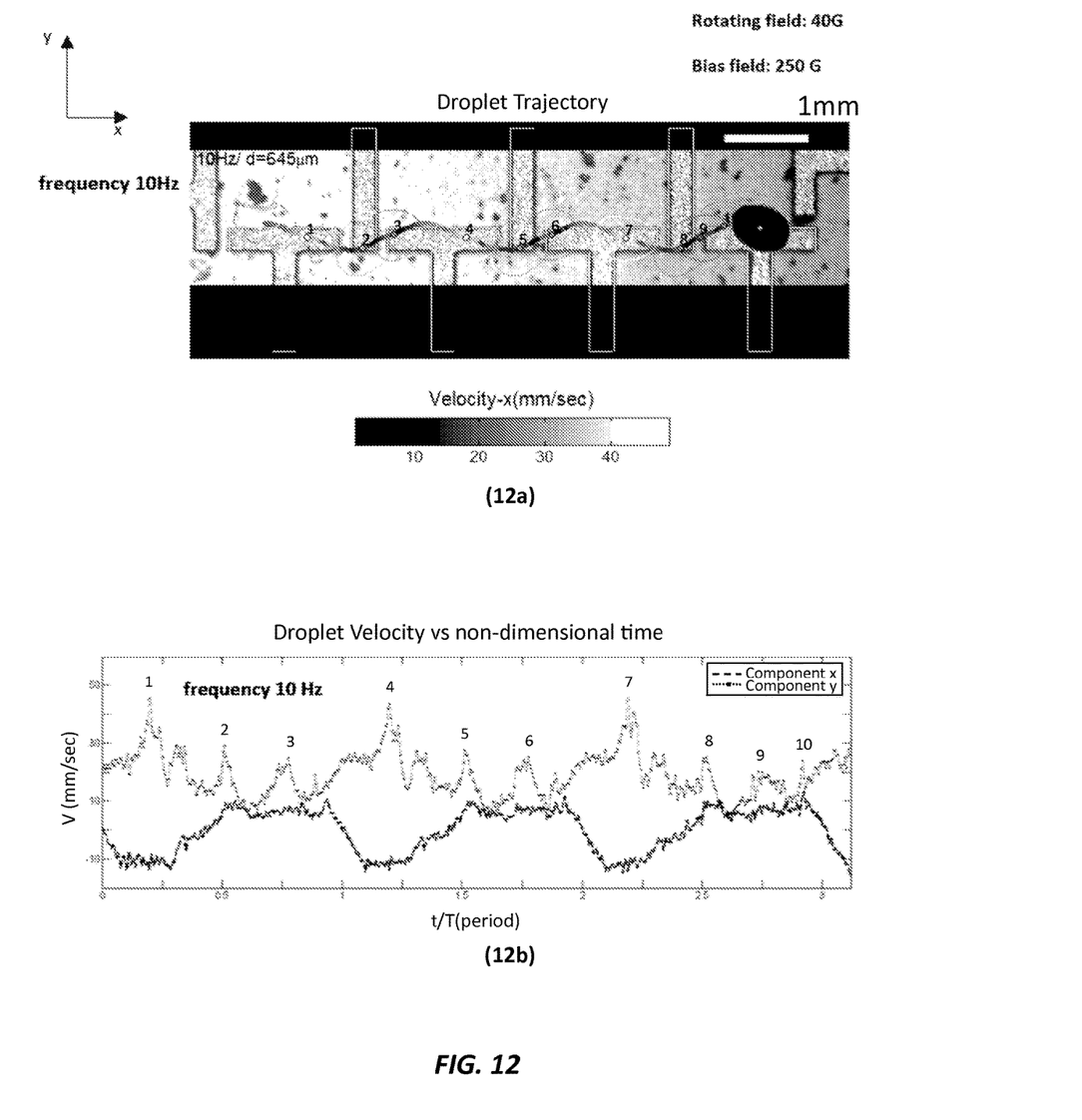
FIGS. 12a-12b show graphs of the trajectory of a propagating droplet and the plot of its velocity as a function of time for frequency of 10 Hz, according to one embodiment of the invention

Apart from the main direction of propagation, there is lateral oscillation, as shown in FIG. 11a and FIG. 12a, where the trajectory of the droplet of FIGS. 8a-8g is shown. Also shown in FIGS. 11b-12b are graphs of the droplet velocity versus time at 2 Hz and 10 Hz magnetic field rotation frequencies, respectively.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example circuits of droplets can be constructed where a droplet can be diverted towards a different path if it collides with another droplet that acts as a position controller.

All such variations are considered to be within the scope and spirit of the present invention as defined by the following claims and their legal equivalents.

What is claimed:

1. A magnetic trap droplet controller, comprising:
   a) a microfluidic plate, wherein said microfluidic plate comprises a magnetic droplet under test, wherein said magnetic droplet under test is disposed in a carrier fluid in said microfluidic plate;
   b) soft magnet elements disposed in said microfluidic plate, wherein said soft magnetic elements are arranged in a two-dimensional distribution of magnetic material shapes;
   c) an active magnet configured to produce a dynamic magnetic field that is external to said microfluidic plate, wherein said active magnet surrounds said solid substrate, said two-dimensional distribution of magnetic material shapes, and said microfluidic plate;
   d) a controller comprising a periodic waveform generator or a switched signal generator connected to a computer having a non-transitory storage medium that is programmed to execute instructions to operate said periodic waveform generator or said switched signal generator, wherein said active magnet is controlled by said controller to produce a dynamic magnetic field, wherein a polarity of said soft magnetic elements is disposed to alternate periodically between north and south poles according to a polarity of said external dynamic magnetic field, wherein said periodic alternating polarities of said soft magnetic elements are arranged to attract and repel said magnetic droplet under test, wherein said pattern of soft magnetic elements is configured to move said magnetic droplet under test along said microfluidic plate according to said polarity of said soft magnetic elements in said two-dimensional distribution of magnetic material shapes.

2. The magnetic trap droplet controller of claim 1, wherein said pattern of soft magnet elements comprises a distribution of magnetic material shapes having a T-shape.

3. The magnetic trap droplet controller of claim 1, wherein said microfluidic plate comprises a volume disposed between two hydrophobic layers.

4. The magnetic trap droplet controller of claim 3, wherein said hydrophobic layers are selected from the group consisting of Teflon, PDMS, fluorosilanes, silicon-based spray-on coating, and superhydrophobic materials.

5. The magnetic trap droplet controller of claim 3, wherein said microfluidic plate comprises a carrier fluid, wherein said carrier fluid is a non-magnetic fluid.

6. The magnetic trap droplet controller of claim 1, wherein said magnetic droplet under test is magnetic nanoparticles dispensed in a fluid, wherein said dynamic magnetic field controls a magnetization of said fluid under test according to said polarity of said external dynamic magnetic field.

7. The magnetic trap droplet controller of claim 6, wherein said magnetic droplet under test comprises magnetic droplets with volumes in a range from 1 nl to 100 µl.

8. The magnetic trap droplet controller of claim 1, wherein said microfluidic plate comprises a material selected from the group consisting of silica, $SiO_2$, silicon wafer, plastic, metal and a non-magnetic solid surface.

9. The magnetic trap droplet controller of claim 1, wherein said soft magnet elements comprise permalloy bars.

10. The magnetic trap droplet controller of claim 1, wherein said dynamic magnetic field is a varying magnitude magnetic field.

11. The magnetic trap droplet controller of claim 1, wherein said microfluidic plate comprises a fluid under test and a carrier fluid, wherein said carrier fluid is non-ferric and said fluid under test is ferric, or wherein said carrier fluid is ferric and said fluid under test is non-ferric.

12. The magnetic trap droplet controller of claim 1, wherein said microfluidic plate comprises fluid guides, wherein said fluid guides are a hydrodynamic resistance inside said fluid chamber.

13. The magnetic trap droplet controller of claim 1, wherein said microfluidic plate comprises a fluid input port and a fluid output port, wherein said magnetic droplet under test and a carrier fluid are input through said input port and output through said output port.

14. The magnetic trap droplet controller of claim 1, wherein said pattern of said soft magnet elements are disposed to collide said magnetic droplet under test with another said droplet under test.

15. The magnetic trap droplet controller of claim 1, wherein said dynamic magnetic field is from an external active magnet comprising a first magnetic coil pair having induction along an x-y plane (Bxy) and along a z-axis (Bz) of said magnetic trap droplet controller, a second magnetic coil pair having induction along an y-z plane (Byz) and along said z-axis (Bz) of said magnetic trap droplet controller and a magnet having a magnetic field along said y-z plane (Byz) and along said z-axis (Bz) of said magnetic trap.

16. The magnetic trap droplet controller of claim 1, where said active magnet is disposed external to said solid substrate or said active magnetic is embedded on said solid substrate.

17. The magnetic trap droplet controller of claim 1 further comprises a micro-coil or current wire disposed above said fluid chamber and disposed to apply an external magnetic field external to said droplet controller.

* * * * *